(12) United States Patent
Pulleyblank

(10) Patent No.: US 9,598,121 B2
(45) Date of Patent: Mar. 21, 2017

(54) COUPLING ASSEMBLY

(71) Applicant: GM GLOBAL TECHNOLOGY OPERATIONS LLC, Detroit, MI (US)

(72) Inventor: Mark Pulleyblank, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 14/268,509

(22) Filed: May 2, 2014

(65) Prior Publication Data

US 2015/0314814 A1    Nov. 5, 2015

(51) Int. Cl.
*B62D 33/02* (2006.01)
*F16B 9/02* (2006.01)

(52) U.S. Cl.
CPC ......... *B62D 33/02* (2013.01); *B62D 33/0207* (2013.01); *F16B 9/02* (2013.01); *F16B 9/026* (2013.01)

(58) Field of Classification Search
CPC ............................. B62D 33/0207; F16B 9/026
See application file for complete search history.

(56) References Cited

U.S. PATENT DOCUMENTS

| 4,408,928 | A | * | 10/1983 | Steinke | F16B 7/0446 403/320 |
| 4,685,646 | A | * | 8/1987 | Harrison | B60P 7/14 248/231.61 |
| 5,560,576 | A | * | 10/1996 | Cargill | B60P 7/15 224/331 |
| 6,471,171 | B1 | * | 10/2002 | VanderVelde | H02G 3/32 248/229.12 |
| 7,997,839 | B1 | * | 8/2011 | Gallegos | B60R 7/08 248/231.61 |
| 8,776,469 | B2 | * | 7/2014 | Morey | E04B 9/183 248/72 |
| 2005/0167459 | A1 | * | 8/2005 | Storer | B60R 9/00 224/405 |
| 2010/0101167 | A1 | * | 4/2010 | Morey | E04B 9/183 52/506.06 |

\* cited by examiner

*Primary Examiner* — Victor MacArthur
(74) *Attorney, Agent, or Firm* — Quinn Law Group

(57) ABSTRACT

A coupling assembly includes a mounting bracket including a first mounting wall and a second mounting wall coupled to the first mounting wall. The coupling assembly further includes a connection bracket including a first connection wall, a second connection wall, and a third connection wall interconnecting the first and second connection walls. The connection bracket defines a first bracket opening extending through the first connection wall and a second bracket opening extending through the second connection wall. The coupling assembly further includes a flange extending from the second mounting wall. The flange extends through the connection bracket via the first and second bracket openings. The coupling assembly further includes a fastener extending through the third connection wall and the flange such that the mounting bracket is coupled to the connection bracket.

19 Claims, 5 Drawing Sheets

COUPLING ASSEMBLY

TECHNICAL FIELD

The present disclosure relates to a coupling assembly for coupling accessories, such as a vertical support or column, to a pickup bed of a vehicle.

BACKGROUND

Vehicles typically include a cargo compartment suitable for carrying cargo. For example, pickup trucks include a pickup bed for carrying cargo. Different accessories, such as a vertical support or column, can be coupled to the pickup bed. A column, for example, may be used to support a beam suitable to carry a load. Accordingly, it is useful to develop a coupling assembly capable of coupling accessories, such as a column, to the pickup bed.

SUMMARY

The present disclosure relates to a coupling assembly for coupling accessories, such as a column or support, to a pickup bed of a vehicle. In an embodiment, the coupling assembly includes a mounting bracket including a first mounting wall and a second mounting wall coupled to the first mounting wall. The coupling assembly further includes a connection bracket including a first connection wall, a second connection wall, and a third connection wall interconnecting the first and second connection walls. The connection bracket defines a first bracket opening extending through the first connection wall and a second bracket opening extending through the second connection wall. The coupling assembly further includes a flange extending from the second mounting wall. The flange extends through the connection bracket via the first and second bracket openings. The coupling assembly further includes a fastener extending through the third connection wall and the flange such that the mounting bracket is coupled to the connection bracket.

The present disclosure also relates to a vehicle including a pickup bed and a coupling assembly as described above. The coupling assembly couples an accessory, such as a column, to the pickup bed.

The above features and advantages and other features and advantages of the present invention are readily apparent from the following detailed description of the best modes for carrying out the invention when taken in connection with the accompanying drawings.

DETAILED DESCRIPTION

Figure 1:
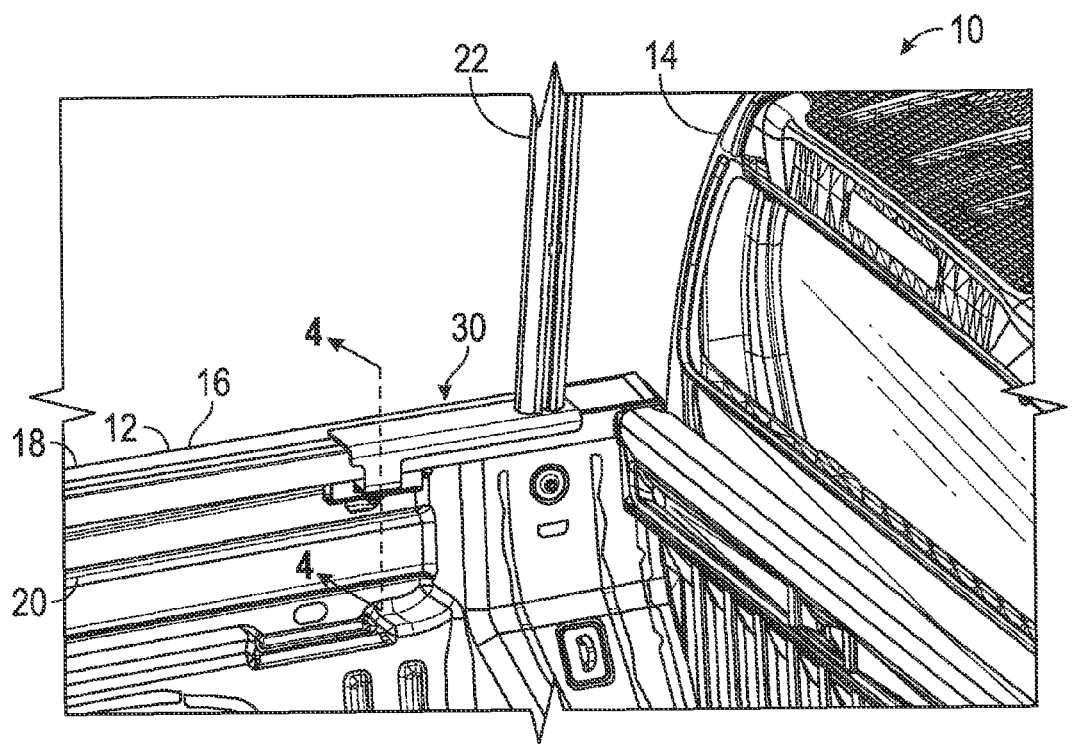
FIG. 1 is a schematic, perspective view of part of a vehicle including a pickup bed and a coupling assembly coupling a support to the pickup bed.
Figure 2:
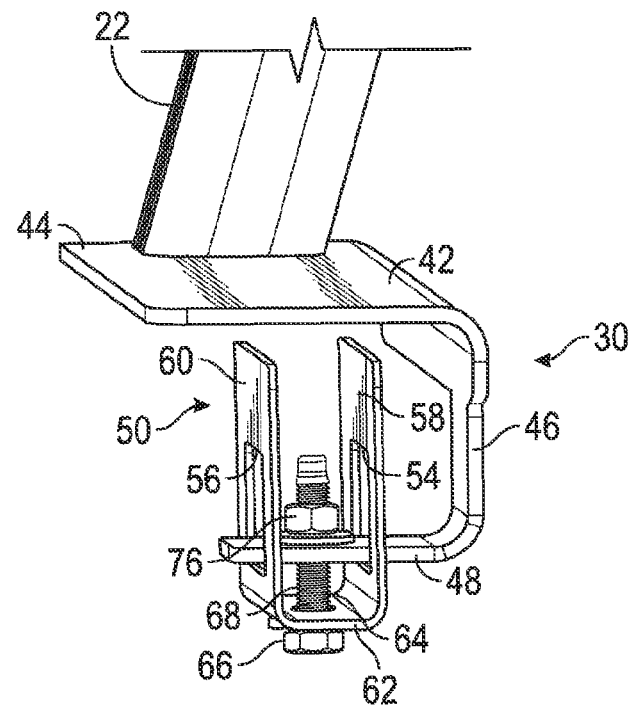
FIG. 2 is a schematic, perspective view of the coupling assembly shown in FIG. 1.

Referring now to the drawings, wherein the like numerals indicate corresponding parts throughout the several views, FIG. 1 schematically illustrates a vehicle 10, such as a pickup truck, including a vehicle body 12. The vehicle body 12 includes a passenger compartment 14 and a cargo compartment 16 coupled to the passenger compartment 14. In the depicted embodiment, the cargo compartment 16 is a pickup bed 18. The pickup bed 18 includes at least one sidewall 20. It is useful to couple accessories, such as a support 22 or any other suitable vertical support, to the sidewall 20 (or any other part of the pickup bed 18). The support 22 may be a column and, along with another support, can support a beam configured to carry a load. The vehicle 10 may further include a coupling assembly 30 configured to couple the support 22 to the pickup bed 18.

Figure 4:
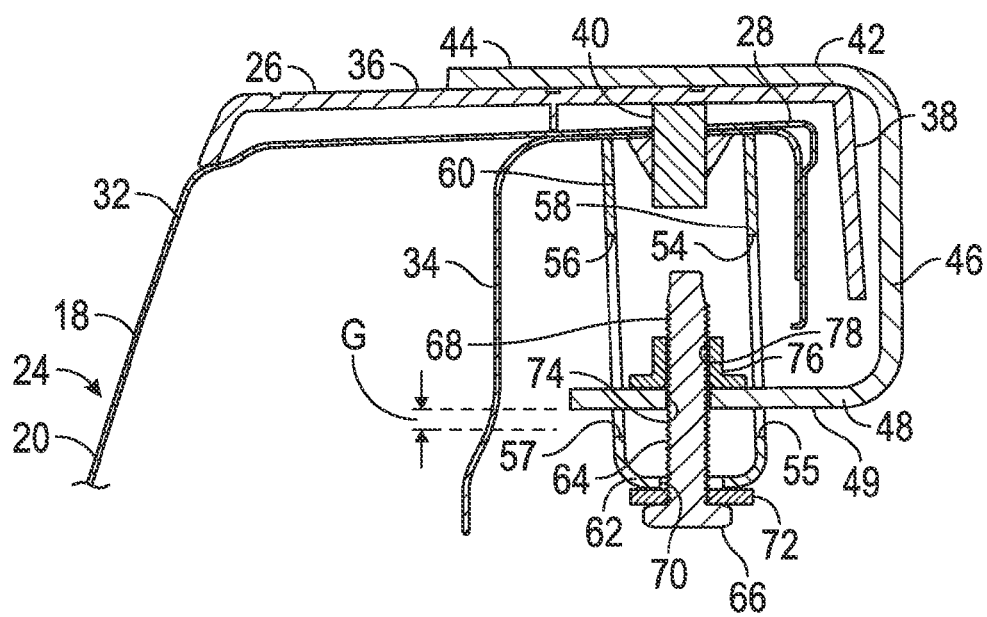
FIG. 4 is a schematic, sectional view of the coupling assembly connected to the pickup bed, taken along section line 4-4 of FIG. 1.
Figure 5:
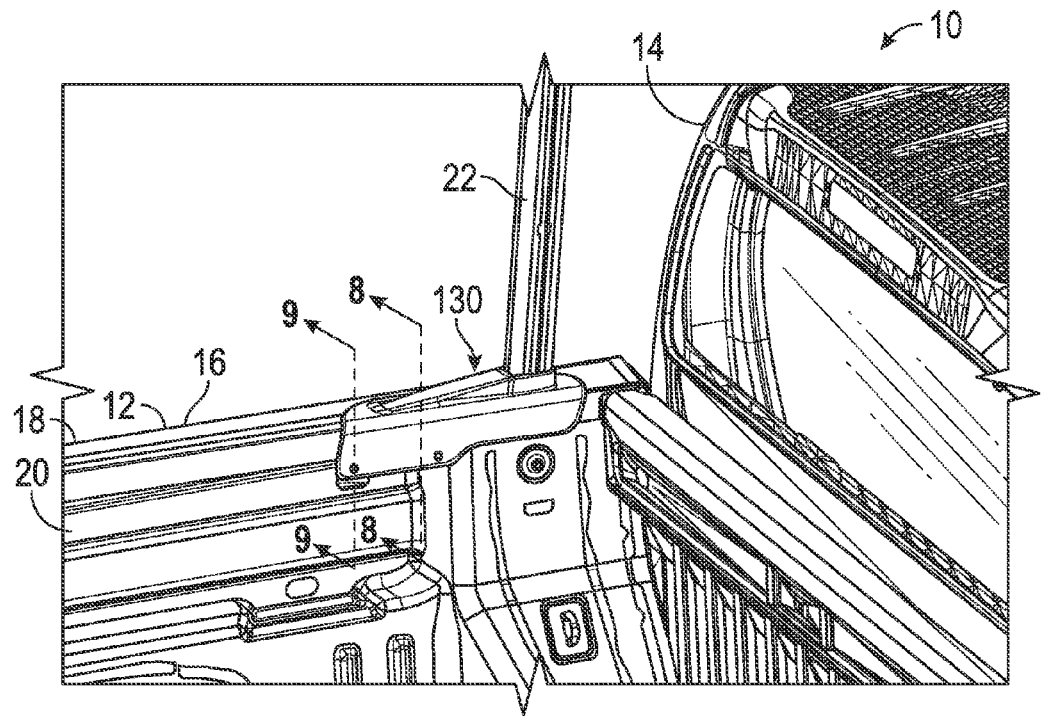
FIG. 5 is a schematic, perspective view of a vehicle including a coupling assembly in accordance with another embodiment of the present disclosure.
Figure 6:
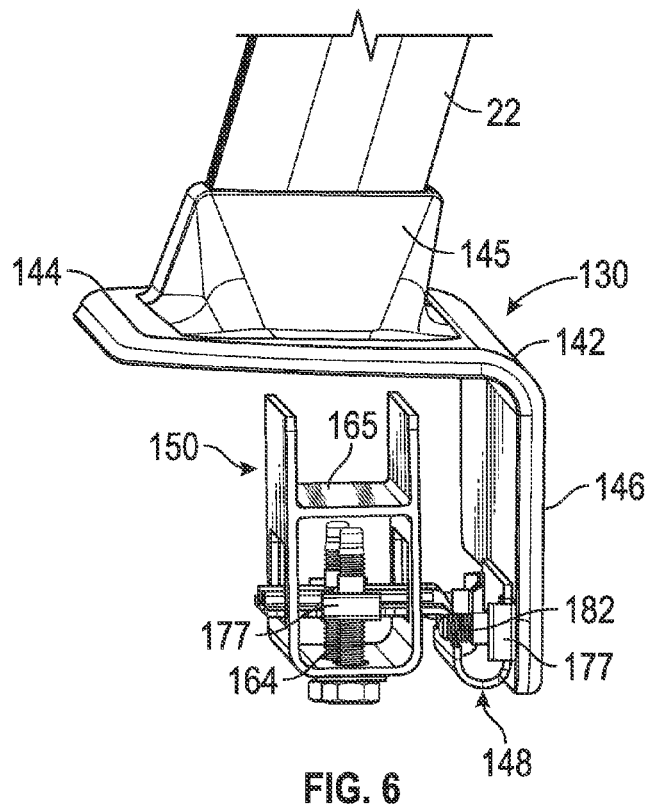
FIG. 6 is a schematic, perspective view of the coupling assembly shown in FIG. 5.
Figure 7:
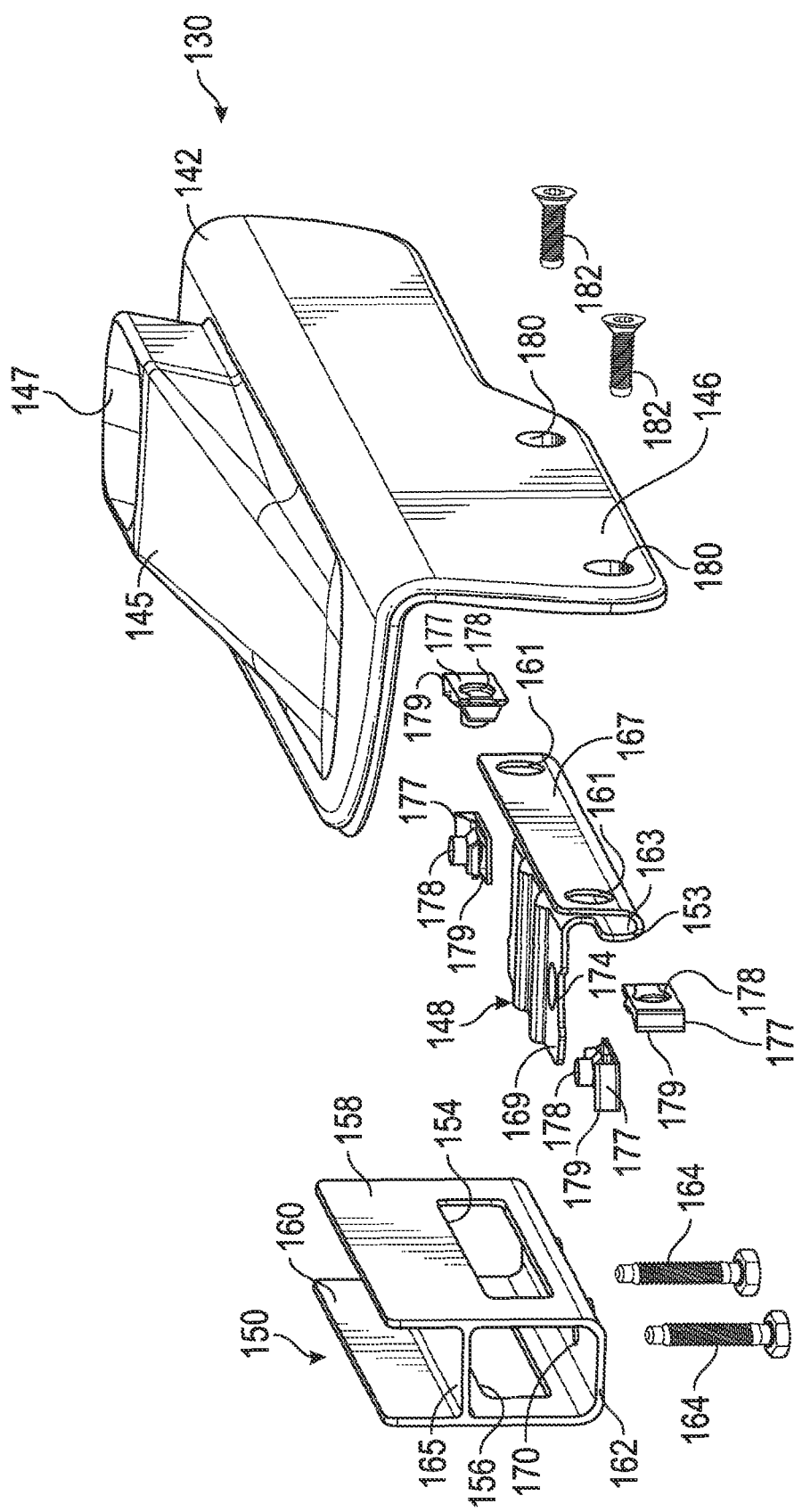
FIG. 7 is a schematic, perspective exploded view of the coupling assembly shown in FIG. 5 without the support.
Figure 8:
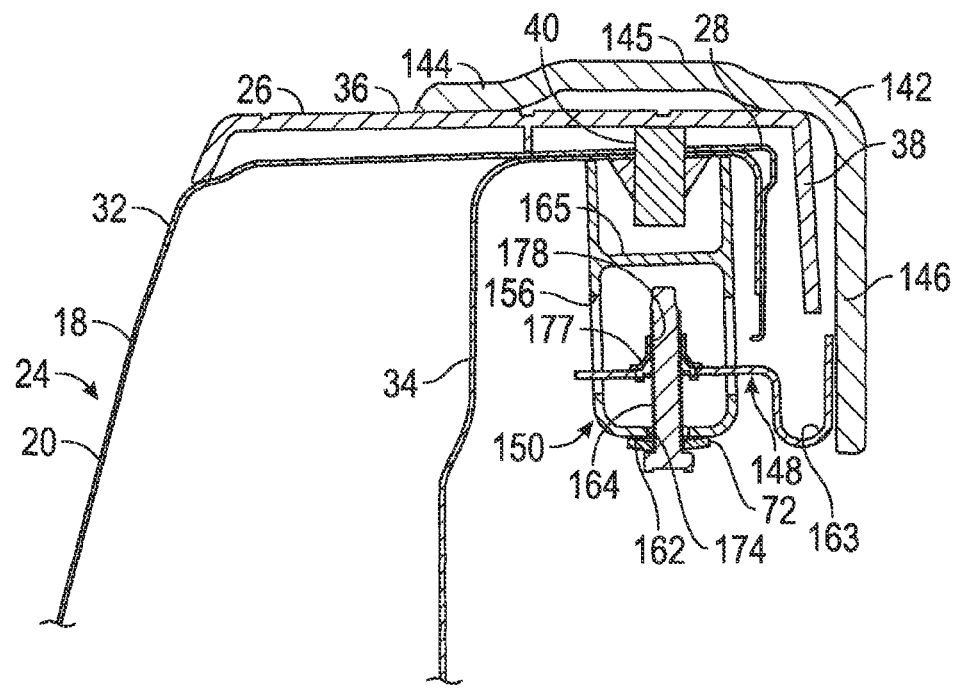
FIG. 8 is a schematic, sectional view of the coupling assembly connected to the pickup bed, taken along section line 8-8 of FIG. 5.
Figure 9:
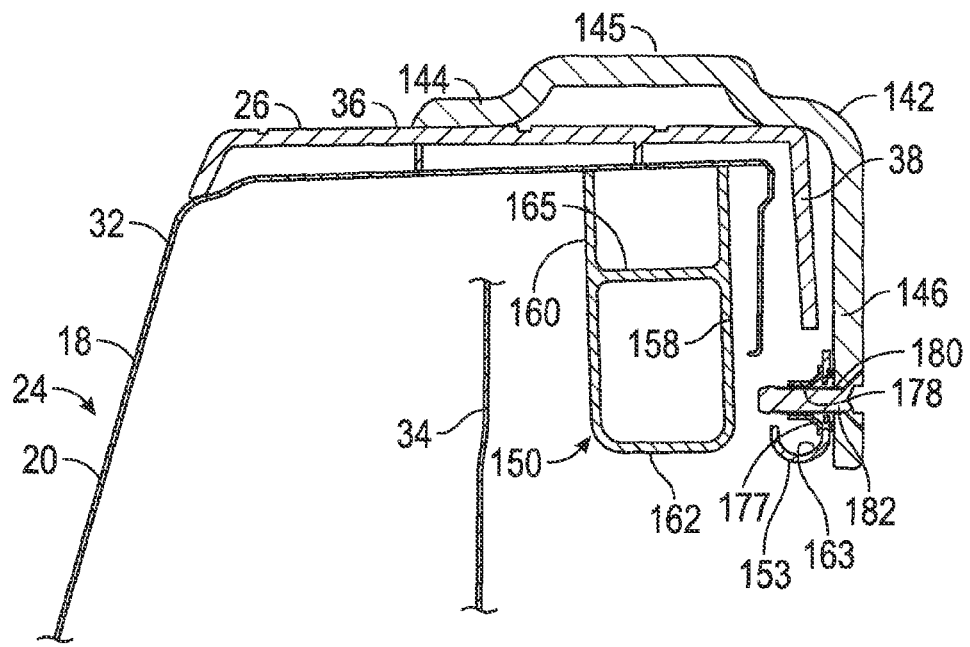
FIG. 9 is a schematic, sectional view of the coupling assembly connected to the pickup bed, taken along section line 9-9 of FIG. 5.

With specific reference to FIG. 4, the pickup bed 18 includes a panel assembly 24 and a trim molding 26 coupled to the panel assembly 24. The panel assembly 24 defines the sidewall 20 and an overhang 28 extending inwardly from the sidewall 20. In the depicted embodiment, the panel assembly 24 includes a first or outer panel 32 and a second or inner panel 34 coupled to the first panel 32. The first and second panels 32, 34 collectively form the sidewall 20 and the overhang 28.

The trim molding 26 is coupled to the first and second panels 32, 34 and includes a first trim wall 36 and a second trim wall 38 coupled to the first trim wall 36. The first trim wall 36 is disposed over the sidewall 20 and the overhang 28. Thus, the trim molding 26 is at least partially disposed over the overhang 28. The second trim wall 38 is substantially perpendicular to the first trim wall 36 so that the trim molding 26 can partially surround the overhang 28. The trim molding 26 may further include a snap feature 40 protruding from the first trim wall 36. The snap feature 40 extends through the overhang 28 in order to couple the trim molding 26 to the panel assembly 24. Specifically, the snap feature 40 extends through the parts of the first and second panels 32, 34 forming the overhang 28, thereby coupling the trim molding 26 to the panel assembly 24.

Referring now to FIGS. 1-4, the coupling assembly 30 is coupled to the support 22. As a non-limiting example, the support 22 may be welded to the coupling assembly 30. Regardless of the coupling method, the coupling assembly 30 includes a mounting bracket 42 directly coupled to the support 22. The mounting bracket 42 may be wholly or partly made of a substantially rigid material, such as metal, and includes a first mounting wall 44 and a second mounting wall 46 coupled to the first mounting wall 44. The first mounting wall 44 may be directly coupled to the support 22 and is configured to rest on the trim molding 26. While the design in FIG. 4 shows the mounting wall 44 resting directly on the trim molding 26, in some cases these two items may be separated by an insulator, manufactured of a material that will protect the surface of the trim molding 26 from being scratched or marked by the contact of the first mounting wall 44. In particular, when the coupling assembly 30 is coupled to the pickup bed 18, the first mounting wall 44 rests on the first trim wall 36 of the trim molding 26. In other words, the first mounting wall 44 rests on the trim molding 26. The second mounting wall 46 may be directly coupled to the first mounting wall 44 and is substantially perpendicular to the first mounting wall 44 so that at least part of the mounting bracket 42 is disposed over the second trim wall 38 of the trim molding 26. Consequently, the mounting bracket 42 is disposed over the first trim wall 36 and the second trim wall 38.

The mounting bracket 42 further includes a flange 48 coupled to the second mounting wall 46. The flange 48 extends from the second mounting wall 46; however, the flange may be integrally formed with the second mounting wall 46 so that the flange 48 and the second mounting wall 46 form a one-piece structure. Accordingly, the second mounting wall 46 interconnects the first mounting wall 44 and the flange 48. The flange 48 is substantially perpendicular to the second mounting wall 46 and substantially parallel to the first mounting wall 44 so that the mounting bracket 42 can be disposed over and under the overhang 28, thereby enhancing the strength of the connection between the coupling assembly 30 and the pickup bed 18.

The coupling assembly 30 additionally includes a connection bracket 50 configured to be coupled to the mounting bracket 42. The connection bracket 50 may have a substantially U-shape and includes a connection bracket body 52 and defines at least one bracket opening (e.g., first connection bracket opening 54 or second connection bracket opening 56) as described below. The connection bracket body 52 includes a first connection wall 58, a second connection wall 60, and a third connection wall 62 interconnecting the first and second connection walls 58, 60. The first and second connection walls 58, 60 may be substantially parallel to each other, and the third connection wall 62 may be substantially perpendicular to the first and second connection walls 58, 60. The connection bracket 50 defines the first connection bracket opening 54, which extends through the first connection wall 58 and the second connection bracket opening 56, which extends through the second connection wall 60. Each of the first and second connection bracket openings 54, 56 is configured, shaped, and sized to receive the flange 48. When the coupling assembly 30 is coupled to the pickup bed 18, the flange 48 extends through the connection bracket body 52 via the first and second connection bracket openings 54, 56. In particular, the flange 48 extends through the first connection wall 58 and the second connection wall 60 (via the first and second connection bracket openings 54, 56) when the coupling assembly 30 is coupled to the pickup bed 18. The third connection wall 62 is substantially perpendicular to first and second connection walls 58, 60 such that the connection bracket 50 has a substantially U-shape. The U-shape of the connection bracket 50 allows the snap feature 40 to be disposed between the first and second connection walls 58, 60 when the coupling assembly 30 is coupled to the pickup bed 18. Accordingly, the connection bracket 50 does not interfere with the snap feature 40 when the coupling assembly 30 is coupled to the pickup bed 18. The connection bracket 50 and the mounting bracket 42 may be stamped or braked formed. However, the connection bracket 50 and the mounting bracket 42 may be made using other manufacturing methods.

The coupling assembly 30 further includes at least one fastener (i.e., a first fastener 64) configured to couple the connection bracket 50 to the mounting bracket 42. In particular, the coupling assembly 30 includes the first fastener 64, which may be a bolt, a screw, or any other kind of fastener suitable to couple the connection bracket 50 to the mounting bracket 42. In the depicted embodiment, the first fastener 64 is a bolt and extends through the connection bracket 50 and the mounting bracket 42. In particular, the first fastener 64 extends through the third connection wall 62 and the flange 48, which is disposed through the first and second connection bracket openings 54, 56, in order to couple the connection bracket 50 to the mounting bracket 42. In the depicted embodiment, the first fastener 64 includes a head 66 and a threaded shaft 68 coupled to the head 66. The connection bracket 50 defines a third bracket opening 70 extending through the third connection wall 62. The third bracket opening 70 is configured, shaped, and sized to receive at least a portion of the first fastener 64. Specifically, the third bracket opening 70 is configured, shaped, and sized to receive the threaded shaft 68 of the first fastener 64. When the threaded shaft 68 is disposed through the third bracket opening 70, the first fastener 64 is at least partly disposed between the first and second connection walls 58, 60. A washer 72 may be disposed between the third connection wall 62 and the head 66 of the first fastener 64 in order to distribute the force exerted by the first fastener 64 along the third connection wall 62.

The mounting bracket 42 defines at least one flange opening 74 extending through the flange 48. The flange opening 74 is configured, shaped, and sized to receive the first fastener 64. In particular, the flange opening 74 is configured, shaped, and sized to receive at least a portion of the threaded shaft 68.

The coupling assembly 30 additionally includes a second fastener 76 substantially aligned with the flange opening 74. The second fastener 76 may be coupled to the flange 48 and is configured to be coupled to the first fastener 64. As a non-limiting example, the second fastener 76 may be welded to the flange 48. In addition, the second fastener 76 may be configured to mate with the first fastener 64. In the depicted embodiment, the first fastener 64 is a bolt, and the second fastener 76 is a nut. Accordingly, in the depicted embodiment, the second fastener 76 may define a threaded hole 78 configured to receive the threaded shaft 68 such that the threaded shaft 68 mates with the threaded hole 78. As a consequence, when the first fastener 64 is disposed through the third connection wall 62 and the flange 48, the second fastener 76 is coupled to the second fastener 76, thereby coupling the connection bracket 50 to the mounting bracket 42. The second fastener 76 is substantially aligned with the flange opening 74 in order to allow the first fastener 64 to pass through the flange opening 74 and mate with the second fastener 76 in order to couple the flange 48 to the mounting bracket 42. Additionally, the position of the first fastener 64 underneath the overhang 28 allows the first fastener 64 and the second fastener 76 to be concealed from view, thereby enhancing the aesthetic appeal of the coupling assembly 30. The first fastener 64 can be tightened relative to the second fastener 76 in order to secure the mounting bracket 42 to the connection bracket 50. Before tightening, however, the mounting bracket 42 and the connection bracket 50 are configured to define a gap G between the flange 48 and the connection bracket 50. Specifically, when the flange 48 is disposed through the first and second connection bracket openings 54, 56 but before the first fastener 64 is tightened, a bottom surface 49 of the flange 48 and the lower surfaces 55, 57 of the connection bracket 50 that define the lower boundaries of the first and second connection bracket openings 54, 56, respectively, are spaced apart from each other so as to define the gap G. During operation, the first fastener 64 can be tightened until the gap G is completely closed and the lower surfaces 55, 57 of the connection bracket 50 contact the bottom surface 49 of the flange 48. The gap G therefore limits the movement of the connection bracket 50 relative to the mounting bracket 42 when the first fastener 64 is tightened. The size of gap G may be designed so as to limit the compressive forces on trim molding 26, as fastener 64 is tightened, thus reducing the potential for damage to trim molding 26. Thus, it is appreciated that as the first fastener 64 is tightened, third connection wall 62 of the connection bracket 50 moves toward the flange 48. The first fastener 64 should be tightened (i.e., turned) until the lower surfaces 55, 57 of the connection bracket 50 contact the bottom surface 49 of the flange 48. At this point, the connection bracket 50 and the flange 48 are disposed underneath the overhang 28.

During assembly, the flange 48 is inserted through the first and second connection bracket openings 54, 56 of the connection bracket 50, and the mounting bracket 42 is placed on the trim molding 26. The first fastener 64 is then inserted and advanced through the third bracket opening 70 and the flange opening 74 until the first fastener 64 mates with the second fastener 76. The first fastener 64 is then tightened to the second fastener 76 (by turning the first fastener 64) in order to move the connection bracket 50 toward the first trim wall 36 of the trim molding 26 until the lower surfaces 55, 57 of the connection bracket 50 contact the bottom surface 49 of the flange 48.

FIGS. 5-9 illustrate a coupling assembly 130 in accordance with another embodiment of the present disclosure. The coupling assembly 130 is similar to coupling assembly 30 (FIG. 1) described above, except for the features described below. In the coupling assembly 130, the flange 148 is not part of the mounting bracket 142. Rather, the flange 148 is a discrete component coupled to the mounting bracket 142. The mounting bracket 142 may be made using casting or any other suitable manufacturing process and includes a first mounting wall 144 and a second mounting wall 146 similar to mounting bracket 42. In addition to the first and second mounting walls 144, 146, the mounting bracket 142 includes a raised section 145 extending from the first mounting wall 144. The mounting bracket 142 defines a support receiving opening 147 extending into or through the raised section 145 and the first mounting wall 144. The support 22 receiving opening 147 is configured, shaped, and sized to be received in the support receiving opening 147. The support 22 is coupled to the mounting bracket 142 within the support receiving opening 147. As a non-limiting example, the support 22 may be welded to the mounting bracket 142 within the support receiving opening 147. Aside from the support receiving opening 147, the mounting bracket 142 defines at least one screw opening 180 extending through the second mounting wall 146. In the depicted embodiment, the mounting bracket 142 defines two screw openings 180. It is contemplated, however, that the mounting bracket 142 may include more or fewer fastener openings 180. Irrespective of the quantity, each screw opening 180 is configured, shaped, and sized to receive a screw 182 or any other suitable fastener. Each screw 182 can extend through one of the screw openings 180 and the flange 148 in order to couple the flange 148 to the mounting bracket 142. Instead or in addition to the screws 182, the mounting bracket 142 may include mating protrusions configured to mate with other mating protrusions of the flange 148 to couple the flange 148 to the mounting bracket 142.

The flange 148 is coupled to the second mounting wall 146 of the mounting bracket 142 and may be made using casting or any other suitable manufacturing process. In the depicted embodiment, the flange 148 includes a first flange wall 167, a second flange wall 169, and a third flange wall 153 interconnecting the first flange wall 167 and the second flange wall 169. The first flange wall 167 is configured to abut the second mounting wall 146 of the mounting bracket 142. The flange 148 defines at least one flange opening (i.e., the first flange opening 161) extending through the first flange wall 167. In the depicted embodiment, two flange openings (i.e., the first flange openings 161) extend through the first flange wall 167. The first flange opening 161 is configured, shaped, and sized to receive at least one screw 182 or any other suitable fastener.

The third flange wall 153 may have a substantially curved shape (e.g., a U-shape) and interconnects the first flange wall 167 and the second flange wall 169. Because of its curved shaped, the third flange wall 153 defines a recess 163.

The second flange wall 169 is directly coupled to the third flange wall 153 and is configured, shaped, and sized to be inserted through the connection bracket 150. The flange 148 defines at least one flange opening 174 extending through the second flange wall 169. In the depicted embodiment, the flange 148 defines two flange openings 174 extending through the second flange wall 169. It is envisioned, however, that the flange 148 may include more or fewer flange openings 174. Regardless of the number of flange openings 174, each flange opening 174 is configured, shaped, and sized to receive a fastener (i.e., the first fastener 164). The first fastener 164 may be a bolt, a screw, or any other suitable fastener capable of coupling the connection bracket 150 to the flange 148. The first fastener 164 may be, for example, similar or identical to fastener 64 (FIG. 3).

The coupling assembly 130 additionally includes a plurality of fastener (i.e., second fasteners 177) capable of mating with the first fasteners 164 and the screws 182. Each second fastener 177 is configured to mate with one first fastener 177 (e.g., bolt) or screw 182. In the depicted embodiment, each second fastener 177 is a metal spring clip 179. Each metal spring clip 179 can be snapped onto the flange 148 and defines a threaded hole 178. Some metal spring clips 179 can be coupled to the first flange wall 167 of the flange 148 so that the threaded holes 178 are substantially aligned with the first flange opening 161, thereby allowing one screw 182 to be inserted through one first flange opening 161 and one threaded hole 178. Other spring metal clips 179 can be coupled to the second flange wall 169 of the flange 148 so that the threaded holes 178 are substantially aligned with the flange opening 174, thereby allowing the first fastener 164 to be inserted through the threaded holes 178 and the flange openings 174.

Figure 3:
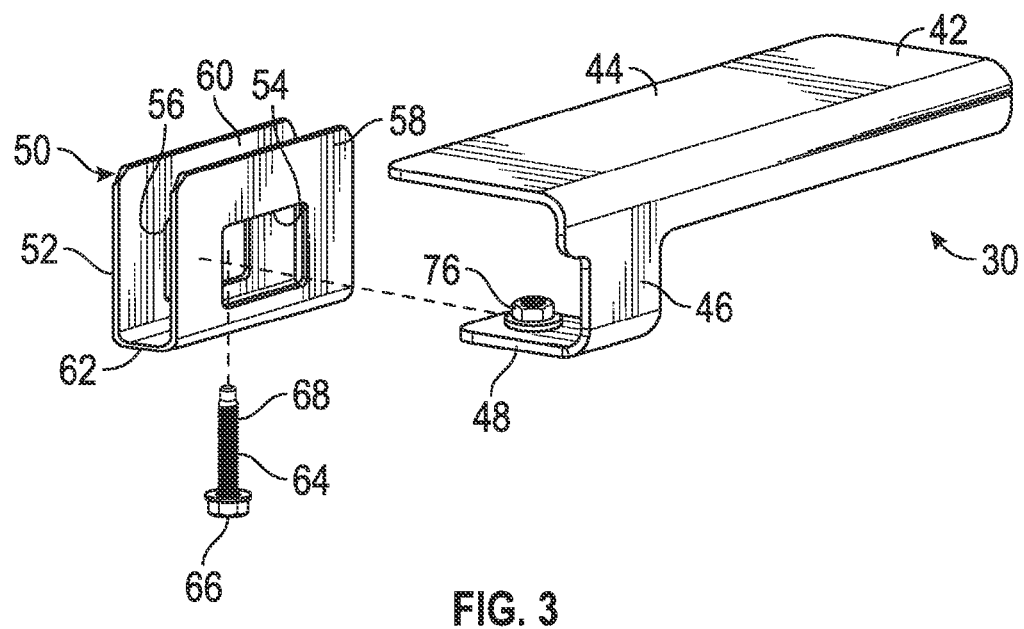
FIG. 3 is a schematic, perspective exploded view of the coupling assembly shown in FIG. 1 without the support.

As discussed above, the coupling assembly 130 further includes the connection bracket 150, which is similar to connection bracket 50 (FIG. 3). The connection bracket 150 may be made using casting or any other suitable manufacturing process and includes a first connection wall 158, a second connection wall 160, and a third connection wall 162 interconnecting the first and second connection walls 158, 160. The connection bracket 150 defines the first connection bracket opening 154 extending through the first connection wall 158 and a second bracket opening 156 extending through the second connection wall 160. The first and second bracket openings 154, 156 are each configured, shaped, and sized to receive at least a portion (i.e., second flange wall 169) of the flange 148. The connection bracket 150 further defines a third bracket opening 170 extending through the third connection wall 162. In the depicted embodiment, the connection bracket 150 has two third bracket openings 170. Each of the third bracket openings 170 is configured, shaped, and sized to receive at least one of the first fasteners 164. Each first fastener 164 can extend through the third bracket opening 170 and the threaded hole 178 of the second fastener 177 in order to couple the connection bracket 150 to the flange 148. In addition, the connection bracket 150 includes a rib 165 extending from the first connection wall 158 to the second connection wall 160. The rib 165 enhances the structural integrity of the connection bracket 150.

During assembly, the second fasteners 177 are snapped to the first flange wall 167 and the second flange wall 169. The flange 148 is coupled to the mounting bracket 142 by, for example, inserting each screw 182 through the screw openings 180, the flange 148, and the threaded hole 178 of the second fastener 177 that are coupled to first flange wall 167. Next, the flange 148 is inserted through the first and second bracket openings 154, 156. Then, the first fastener 164 is inserted and advanced through the third bracket opening 170 and the flange opening 174 in order to couple the connection bracket 150 to the flange 148.

While the best modes for carrying out the invention have been described in detail, those familiar with the art to which this invention relates will recognize various alternative designs and embodiments for practicing the invention within the scope of the appended claims.

The invention claimed is:

1. A coupling assembly, comprising:
 a mounting bracket including a first mounting wall and a second mounting wall coupled to the first mounting wall;
 a connection bracket including a first connection wall, a second connection wall, and a third connection wall interconnecting the first and second connection walls, the connection bracket defining a first bracket opening extending through the first connection wall and a second bracket opening extending through the second connection wall;
 a flange extending from the second mounting wall, the flange extending through the connection bracket via the first and second bracket openings; and
 a fastener extending through the third connection wall and the flange such that the mounting bracket is coupled to the connection bracket.

2. The coupling assembly of claim 1, wherein the fastener is a first fastener, and the coupling assembly further includes a second fastener coupled to the flange, and the second fastener mates with the first fastener to couple the flange to the connection bracket.

3. The coupling assembly of claim 2, wherein the connection bracket defines a third bracket opening extending through the third connection wall, and the first fastener extends through the third bracket opening.

4. The coupling assembly of claim 3, wherein the flange defines a flange opening, and the first fastener extends through the flange opening.

5. The coupling assembly of claim 4, wherein the second fastener is substantially aligned with the flange opening in order to allow the first fastener to pass through the flange opening and mate with the second fastener.

6. The coupling assembly of claim 5, wherein the first fastener is at least partly disposed between the first and second connection walls.

7. The coupling assembly of claim 5, wherein the second fastener is directly coupled to the flange, and the first fastener extends through the second fastener.

8. The coupling assembly of claim 1, wherein the first and second connection walls are substantially parallel to each other, and the third connection wall is substantially perpendicular to the first and second connection walls.

9. The coupling assembly of claim 8, wherein the first connection wall, the second connection wall, and the third connection wall are coupled to each other such that the connection bracket has a substantially U-shape.

10. The coupling assembly of claim 9, wherein the first mounting wall is substantially perpendicular to the second mounting wall, and the flange is substantially parallel to the first mounting wall.

11. The coupling assembly of claim 10, wherein the flange is integrally formed with the second mounting wall such that the flange and the second mounting wall jointly form a one-piece structure.

12. The coupling assembly of claim 10, wherein the flange is a discrete component coupled to the mounting bracket.

13. The coupling assembly of claim 1, wherein the flange includes a flange body, the flange body has a first flange surface and a second flange surface opposite the first flange surface, the first flange surface faces the first mounting wall, the second flange surface faces away from the first mounting wall, the flange defines a flange opening extending through the flange body such that the flange opening extends through the first flange surface and the second flange surface, and the flange opening partially receives the fastener such that the fastener extends through the flange body, the first flange surface, and the second flange surface.

14. The coupling assembly of claim 13, wherein the flange body, the first flange surface, and the second flange surface are elongated along a same direction such that the flange body, the first flange surface, and the second flange surface are parallel to one another.

15. The coupling assembly of claim 14, further comprising a rib directly interconnecting the first connection wall and the second connecting wall, wherein the rib is elongated along the same direction as the flange body, the first flange surface, and the second flange surface.

16. The coupling assembly of claim 1, further comprising a spring clip and a screw, wherein the spring clip defines a threaded hole, the flange includes a first flange wall, a second flange wall, and a third flange wall directly interconnecting the first flange wall and the second flange wall, the third flange wall has a U-shape, the flange defines at least one flange opening extending through the first flange wall, the second flange wall extends through the first connection wall and the second connection wall through the first bracket opening and the second bracket opening, the first flange wall and the third flange wall are disposed outside the connection bracket, the spring clip is snapped directly to the first flange wall, the mounting bracket defines a screw opening extending through the second mounting wall, the screw opening partially receives the screw, the threaded hole partially receives the screw, and the screw opening and the threaded hole are aligned to allow the screw to extend through the threaded hole and the screw opening.

17. The coupling assembly of claim 16, wherein the at least one flange opening is a first flange opening, the threaded hole is a first threaded hole, the spring clip is a first spring clip, the coupling assembly further includes a second spring clip, the second spring clip defines a second threaded hole, the flange defines a second flange opening extending through the second flange wall, the connection bracket defines a third bracket opening extending through the third connection wall, the third bracket opening partially receives the fastener, the second threaded hole partially receives the fastener, the third bracket opening and the second threaded hole are aligned to allow the fastener to extend through the second threaded hole and the third bracket opening.

18. The coupling assembly of claim 17, wherein the mounting bracket includes a raised section extending from the first mounting wall, the raised section is obliquely angled relative to the first mounting wall and the second mounting wall, and the mounting bracket defines a support receiving opening extending into the raised section.

19. The coupling assembly of claim 1, wherein the flange is cantilevered from the second mounting wall.

* * * * *